United States Patent
Takenaka (10) Patent No.: US 9,688,102 B2
(45) Date of Patent: Jun. 27, 2017

(54) MOTORCYCLE TIRE

(71) Applicant: Sumitomo Rubber Industries, Ltd., Kobe-shi, Hyogo (JP)

(72) Inventor: Kouji Takenaka, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 325 days.

(21) Appl. No.: 13/756,629

(22) Filed: Feb. 1, 2013

(65) Prior Publication Data

US 2013/0199682 A1   Aug. 8, 2013

(30) Foreign Application Priority Data

Feb. 3, 2012 (JP) .................................. 2012-022223

(51) Int. Cl.
*B60C 11/03* (2006.01)
*B60C 11/117* (2006.01)

(52) U.S. Cl.
CPC ... *B60C 11/0302* (2013.04); *B60C 2011/0372* (2013.04); *B60C 2011/0374* (2013.04); *B60C 2200/10* (2013.04)

(58) Field of Classification Search
CPC ............. B60C 11/0311; B60C 11/0316; B60C 11/032; B60C 11/0323; B60C 11/1353; B60C 11/1369; B60C 2011/0313; B60C 2011/1361
USPC ............ 152/209.11, 209.17, 209.18, 209.19, 152/209.22, 209.25; D12/500–608
See application file for complete search history.

(56) References Cited

U.S. PATENT DOCUMENTS

| | | | | |
|---|---|---|---|---|
| D347,609 S | * | 6/1994 | Misani | D12/535 |
| 6,220,320 B1 | * | 4/2001 | Nakagawa et al. | 152/209.11 |
| D612,322 S | * | 3/2010 | Shibamoto | D12/535 |
| D625,682 S | * | 10/2010 | Shibamoto | D12/535 |
| D644,596 S | * | 9/2011 | Takenaka | D12/535 |
| D659,079 S | * | 5/2012 | Takenaka | D12/535 |
| D674,737 S | * | 1/2013 | Lamour | D12/535 |
| D687,368 S | * | 8/2013 | Takenaka | D12/535 |
| 2005/0039835 A1 | * | 2/2005 | Yamane | 152/209.11 |

(Continued)

FOREIGN PATENT DOCUMENTS

| | | | | |
|---|---|---|---|---|
| EP | 368553 A | * | 5/1990 | B60C 11/04 |
| GB | 2114069 A | * | 8/1983 | B60C 11/032 |

(Continued)

*Primary Examiner* — Steven D Maki
*Assistant Examiner* — Kendra Ly
(74) *Attorney, Agent, or Firm* — Birch, Stewart, Kolasch & Birch, LLP (57) ABSTRACT

A motorcycle tire improved in transient characteristics when leaned is disclosed, wherein the tread portion has a unidirectional tread pattern comprising: inside oblique main grooves disposed on each side of the tire equator staggeredly, inclined to the axially outside toward the intended rotational direction (R) at an angle of 5 to 30 degrees with respect to the circumferential direction, and each having an inner end (Ai) at a distance of 0 to 30% of the half tread width (W) from the tire equator; and outside oblique main grooves 11 disposed on each side of the tire equator staggeredly, inclined to the axially outside toward the counter-rotational direction at an angle of 10 to 60 degrees with respect to the circumferential direction, and each having an inner end (Bi) axially inside the outer end (Ao).

12 Claims, 5 Drawing Sheets

(56) References Cited

U.S. PATENT DOCUMENTS

| | | | |
|---|---|---|---|
| 2006/0130949 A1* | 6/2006 | Nakamura | 152/209.11 |
| 2009/0078349 A1* | 3/2009 | Nakagawa | 152/209.11 |
| 2009/0308515 A1 | 12/2009 | Matsunaga | |
| 2012/0285593 A1* | 11/2012 | Mariani et al. | 152/209.8 |

FOREIGN PATENT DOCUMENTS

| | | | | |
|---|---|---|---|---|
| JP | 63121505 A | * | 5/1988 | |
| JP | 03135802 A | * | 6/1991 | B60C 11/04 |

* cited by examiner

MOTORCYCLE TIRE

BACKGROUND OF THE INVENTION

The present invention relates to a pneumatic tire, more particularly to a motorcycle tire having a unidirectional tread pattern by which transient characteristics when a motorcycle is leaned to make a turn, can be improved without sacrificing the traction performance and tire life.

Figure 5:
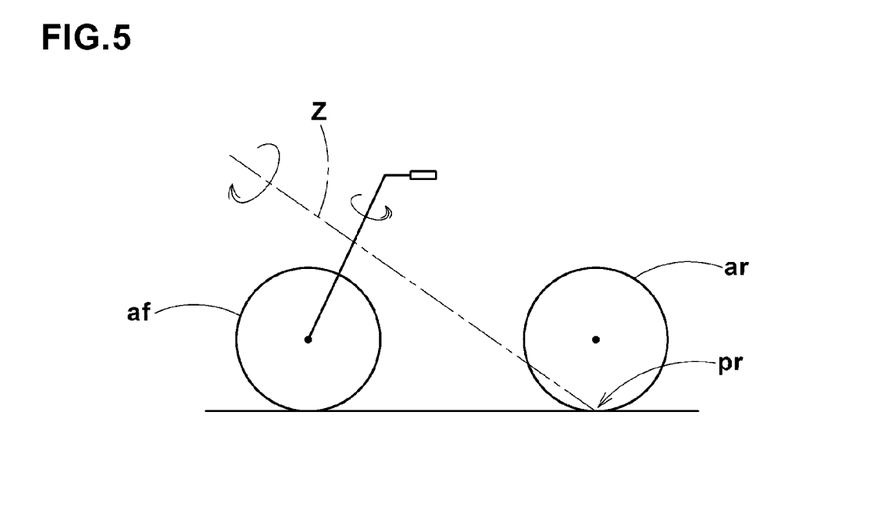
FIG. 5 is a diagram for explaining the roll of a motorcycle making a turn.

In the case of a motorcycle, when a rider initiates a turn and leans into the turn, the motorcycle rotates around its roll axis z (shown in FIG. 5) extending forward and obliquely upward from the ground contacting patch (pr) of the rear tire (ar), and a steering angle occurs on the front tire (af) according to the roll, thereby the motorcycle can make a turn.

In order to improve the cornering performance, the motorcycle tire is required to have easiness of leaning the motorcycle when enter the initial stage of the leaning from the vertical state during straight running. And in order to stop the leaning of the motorcycle after that, the motorcycle tire is required to have stability of leaning from the middle stage to the final stage of the leaning (full lean state). Further, the motorcycle tire is required to give the rider a linear transitional response from the initial stage to the final stage of the leaning. Thus, in the case of the motorcycle tires, it is required to have improved transient characteristics when the motorcycle is leaned to make a turn (hereinafter, the "roll characteristic").

Figure 6:
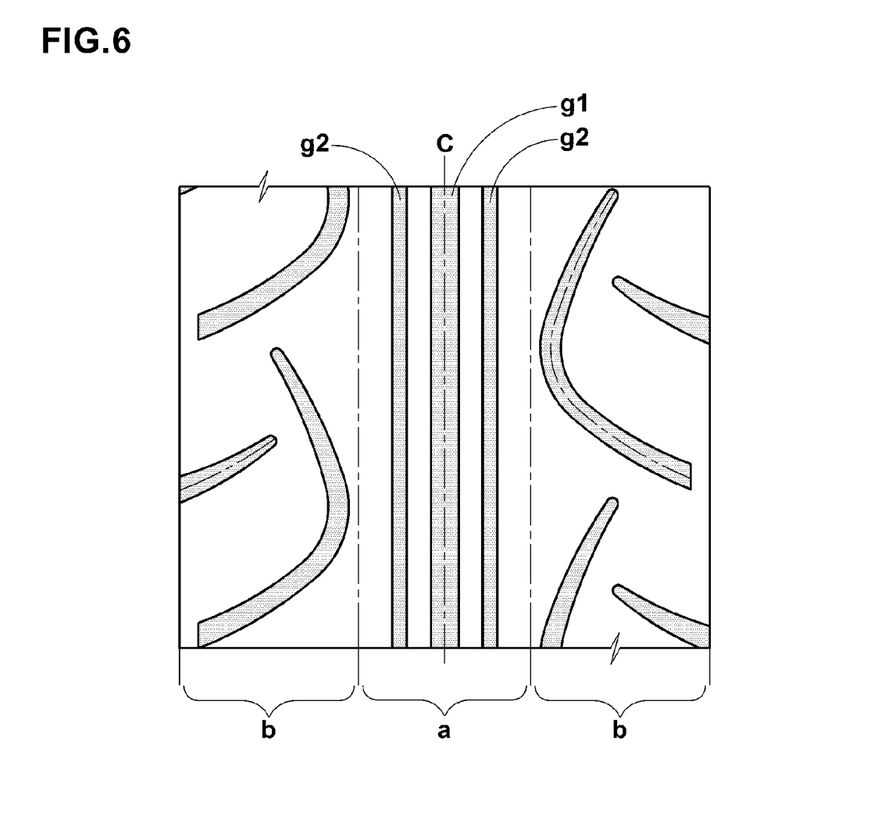
FIG. 6 is a developed partial plan view of a prior-art motorcycle tire showing its tread pattern.

In the united states Patent Application Publication No. US 2009/308515 A1, a motorcycle tire reduced in the rolling resistance without deteriorating the above-mentioned roll characteristic is disclosed, wherein the tread portion is, as shown in FIG. 6, provided in the central ground contacting zone (a) during straight running with three circumferential grooves g1 and g2. As a result, the tire has easiness of leaning when the motorcycle enters the initial stage of the leaning from the vertical state during straight running.

However, the increase in the response about the leaning when the ground contacting area shifts from the central ground contacting zone (a) to the lateral ground contacting zone (b), becomes insufficient instead. As a result, from the middle stage to the final stage of the leaning, there is a tendency that the motorcycle rotates at a higher rate around its roll axis, and the cornering performance is deteriorated. Further, there is a tendency that the traction performance and tire life are deteriorated because the circumferential grooves g1 and g2 are disposed in the central zone (a) where the ground pressure becomes highest.

SUMMARY OF THE INVENTION

It is therefore, an object of the present invention to provide a motorcycle tire, in which the roll characteristic (the above-mentioned transient characteristics) can be improved without sacrificing the traction performance and tire life.

According to the present invention, a motorcycle tire comprises:

a tread portion having tread edges and a tread face extending therebetween and curved so that the maximum section width of the tire lies between the tread edges, the tread portion provided with tread grooves defining a unidirectional tread pattern having an intended tire rotational direction (R), the tread grooves including inside oblique main grooves (10) and outside oblique main grooves (11), wherein the inside oblique main grooves (10) are arranged circumferentially of the tire and staggeredly on both side of the tire equatorial plane (C), the inside oblique main grooves (10) each extend from its axially inner end (Ai) to its axially outer end (Ao), while inclining to the axially outside of the tire toward the intended tire rotational direction (R) at an inclination angle α of from 5 to 30 degrees with respect to the tire circumferential direction, the axially inner end (Ai) is spaced apart axially outwardly from the tire equatorial plane (c) by an axial distance of from 0 to 10% of the half tread width (W), the outside oblique main grooves (11) are arranged circumferentially of the tire and staggeredly on both side of the tire equatorial plane (C), the outside oblique main grooves (11) each extend from its axially inner end (Bi) to its axially outer end (Bo), while inclining to the axially outside of the tire toward the opposite direction to the intended tire rotational direction (R), the axially inner end (Bi) is located axially inward of the outer end (Ao) of the inside oblique main groove (10), the axially outer end (Bo) is spaced apart from the tire equatorial plane (C) by an axial distance of from 80 to 95% of the half tread width (W), an inclination angle β of the outside oblique main groove (11) with respect to the tire circumferential direction is gradually increased from the inner end (Bi) toward the axially outer ends (Bo) within a range between 10 degrees and 60 degrees.

Here, the half tread width (W) is a distance measured from the tire equator to one of the tread edges along the tread face and a tire meridian section.

In this application including specification and claims, various distances, lengths and widths are those measured along the tread face unless otherwise noted. For example, the "axial distance/length/width" are those measured along the tread face and a tire meridian section. The "circumferential distance/length/width" are those measured along the tread face in parallel with a tire circumferential direction.

Therefore, the tread grooves which mainly exist in the ground contacting area in the initial stage of leaning are the inside oblique main grooves. Since the inside oblique main grooves are staggered and inclined with a small angle α, the ground contacting area is provided with relatively high pattern rigidity capable of exerting excellent straight running performance, traction and tire life.

On the other hand, the tread grooves which mainly exist in the ground contacting area from the middle stage to the final stage of the leaning (namely, full lean state) are the outside oblique main grooves. The outside oblique main grooves are inclined oppositely to the inside oblique main grooves, and their inclination angles β with respect to the tire circumferential direction are gradually increased from the axially inside to the outside. Further, the axially inner ends (Bi) of the outside oblique main grooves overlap with the inside oblique main grooves in the axial direction. Therefore, from the initial stage to the final stage of the leaning, the transient property of the response becomes linear and the roll characteristic is improved.

The motorcycle tire according to the present invention may be further provided with the following features (I), (II), (III):

(I) the outside oblique main grooves (11) on each side of the tire equatorial plane (C) each overlap, in the tire circumferential direction, with one of the inside oblique main grooves (10) on the same side and also one of the inside oblique main grooves (10) on the other side of the tire equatorial plane (C);

(II) the tread grooves further include middle oblique main grooves (12) disposed on each side of the tire equatorial plane (c), the middle oblique main grooves (12) are inclined to the axially outside of the tire toward the opposite direction to the intended tire rotational direction (R), on each side of the tire equatorial plane (c), axially inner ends (Ci) of the middle oblique main grooves (12) are positioned axially outward of the axially outer ends (Ao) of the inside oblique main grooves (10), and axially outer ends (Co) of the middle oblique main grooves (12) are positioned axially inward of the axially outer ends (Bo) of the outside oblique main grooves (11);

(III) the tread grooves further include outside oblique subsidiary grooves (13) disposed on each side of the tire equatorial plane (C), the outside oblique subsidiary grooves (13) are inclined to the axially outside of the tire toward the opposite direction to the intended tire rotational direction (R), on each side of the tire equatorial plane (C), axially inner ends (Di) of the outside oblique subsidiary grooves (13) are positioned axially inward of the axially outer ends (Co) of the middle oblique main grooves (12), and axially outer ends (Do) of the outside oblique subsidiary grooves (13) are positioned axially outward of the axially outer ends (Co) of the middle oblique main grooves (12) and axially inward of the axially outer ends (Bo) of the outside oblique main grooves (11).

DESCRIPTION OF THE PREFERRED EMBODIMENTS

Embodiments of the present invention will now be described in detail in conjunction with accompanying drawings.

Figure 1:
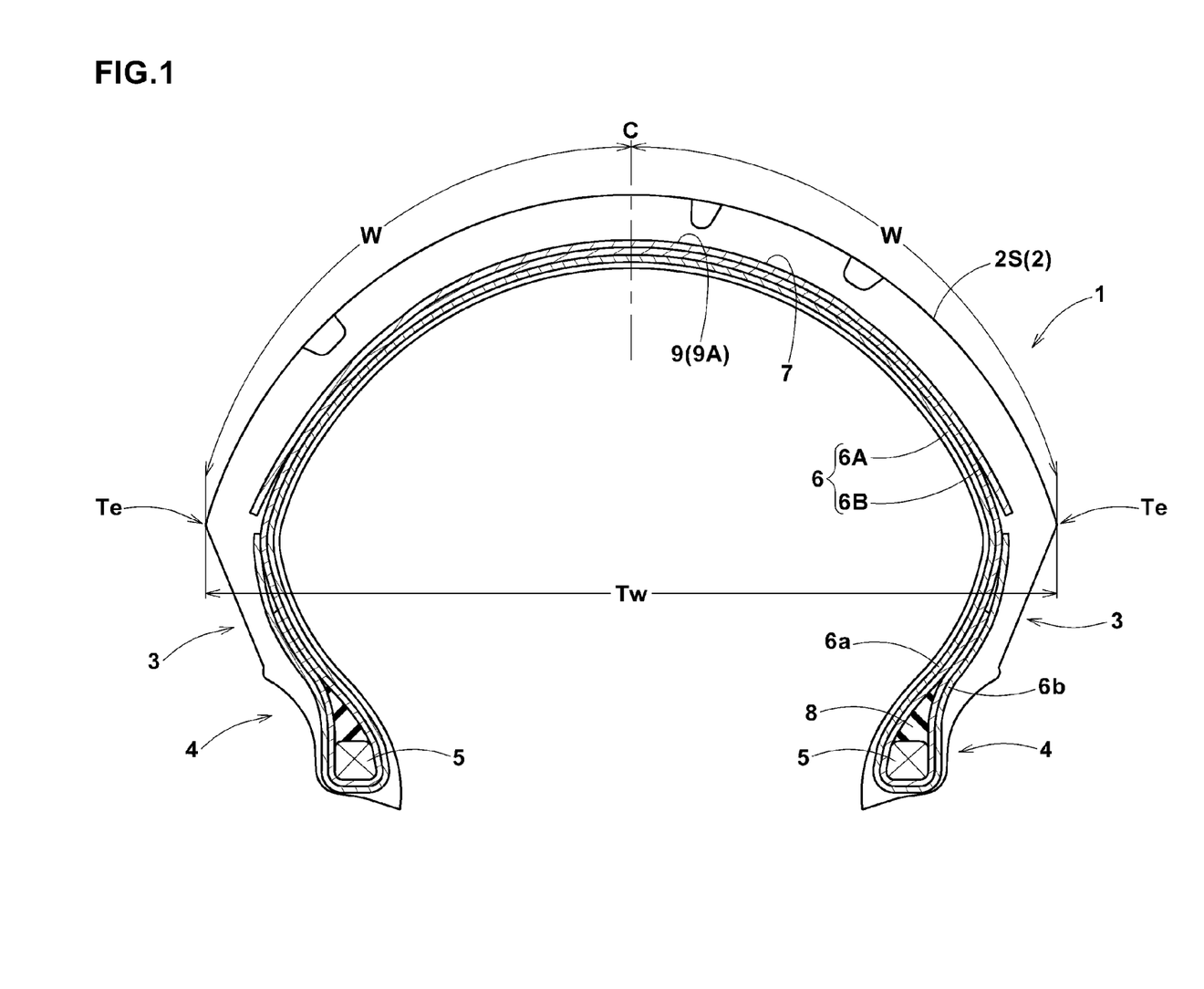
FIG. 1 is a cross sectional view of a motorcycle tire as an embodiment of the present invention.

In the drawings, motorcycle tire 1 according to the present invention comprises a tread portion 2, a pair of axially spaced bead portions 4 each with a bead core 5 therein, a pair of sidewall portions 3 extending between the tread edges Te and the bead portions, a carcass 6 extending between the bead portions 4, and a tread reinforcing layer 7 disposed radially outside the carcass in the tread portion.

The tread portion 2 (inclusive of the carcass 6, the tread reinforcing layer 7 and a tread rubber thereon) is curved with a relatively small radius of curvature when compared with the passenger car tires, truck/bus tires and the like, and as a result, the maximum cross section width Tw of the tire lies between the tread edges Te.

In the tire meridian section, the tread face 2S or the outer surface of the tread portion 2 between the tread edges Te has a smoothly curved tread profile which is defined by a single radius curve or a multi-radius curve, for example, a relatively small radius defining a tread center region and a relatively large radius defining a tread shoulder region.

The carcass 6 is composed of at least one ply of cords arranged radially at an angle in the range of from 60 to 90 degrees with respect to the tire equatorial plane C, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween.

In this embodiment, the carcass 6 is composed of two plies 6A and 6B. In addition, a carcass 6 of a bias structure in which carcass cords are arranged at angles of 20 to 60 degrees with respect to the tire equatorial plane C may be employed.

The bead portions 4 are each provided between the main portion 6a and turned up portion 6b of the carcass ply with a bead apex 8. The bead apex 8 is made of hard rubber extending radially outwards from the radially outside of the bead core 5, while tapering towards its radially outer end.

In this embodiment, the tread reinforcing layer 7 is a band 9 composed of at least one ply, in the illustrated example only one ply 9A, of spiral windings or turns of at least one band cord. Instead of such spiral cord band, it is also possible to employ a band structure formed by winding a conventional full-width strip of rubberized parallel cords. It is of course possible to dispose a breaker alone or in combination with the zero-degree band 9 as the tread reinforcing layer 7. Incidentally, the band means a reinforcing cord layer in which the cord angle is substantial zero or less than about 10 degrees with respect to the tire circumferential direction. The breaker is a reinforcing cord layer composed of one or more plies of parallel cords laid at an angle of from 10 to 70 degrees with respect to the tire circumferential direction.

Figure 2:
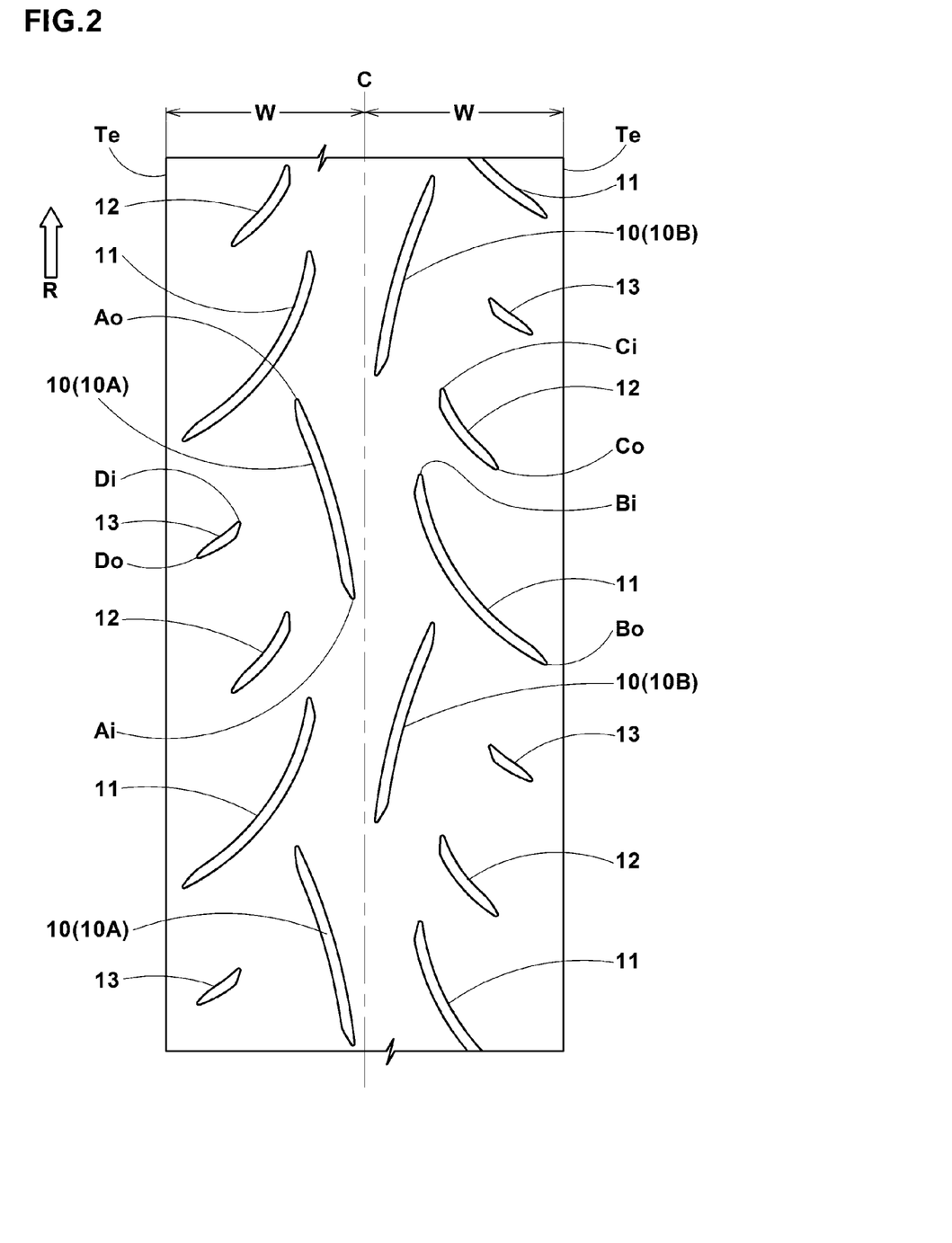
FIG. 2 is a developed partial plan view of the motorcycle tire showing a tread pattern.

According to the present invention, the motorcycle tire 1 is provided in the tread portion 2 with tread grooves defining a unidirectional tread pattern having a designed intended tire rotational direction (R). Incidentally, the intended tire rotational direction (R) is indicated in the sidewall portions of the tire by the use of for example an arrowed line or the like.

The tread grooves disposed on each side of the tire equator (C) include inside oblique main grooves 10, outside oblique main grooves 11, middle oblique main grooves 12, and outside oblique subsidiary grooves 13.

Figure 3:
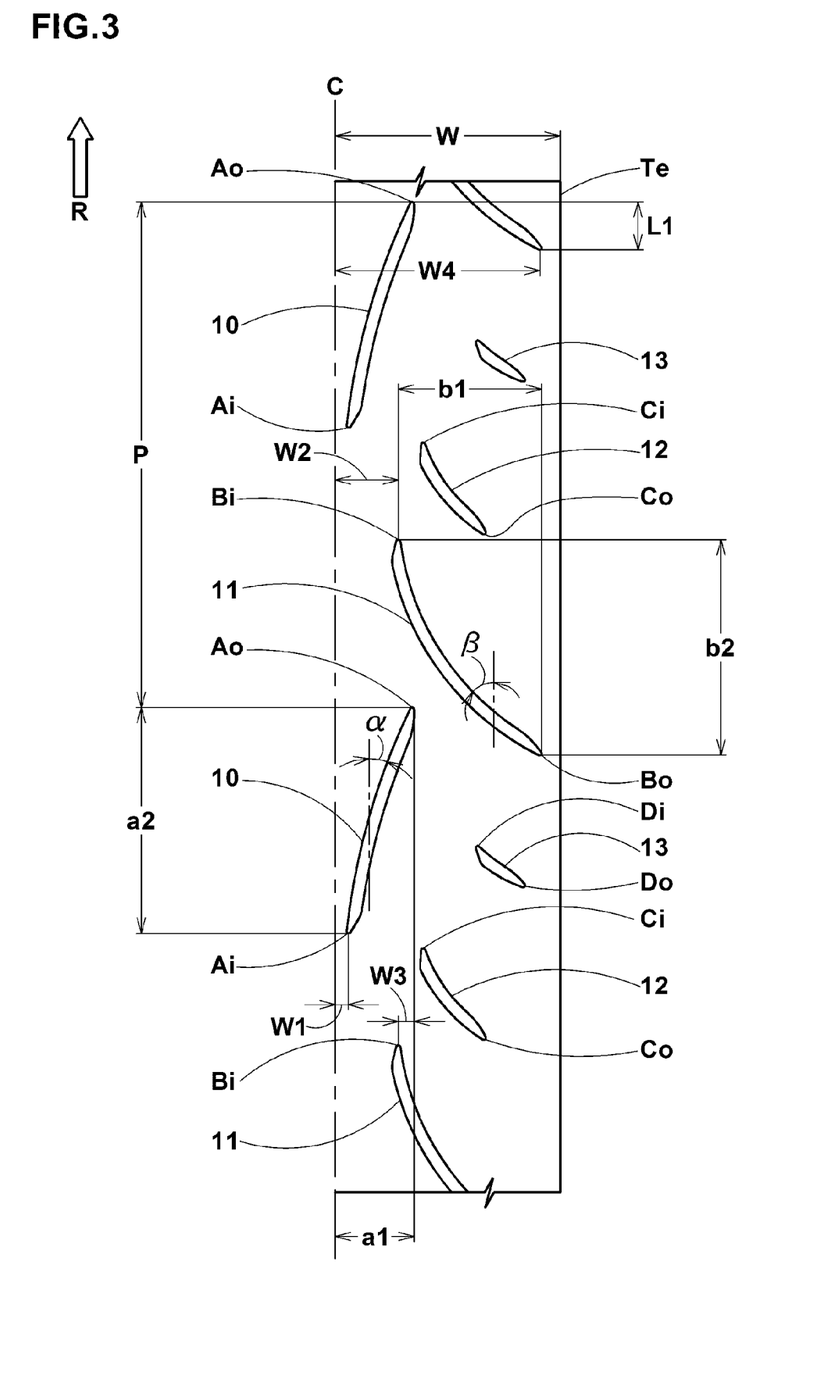
FIGS. 3 and 4 each show one half of the tread pattern shown in FIG. 2 to explain an example of the geometrical arrangement of the tread grooves.

As shown in FIG. 3, the axially inner end (Ai) of the inside oblique main groove 10 is located at an axial distance W1 of from 0 to 10% of the half tread width (W) from the tire equator (C).

If the axial distance W1 exceeds 10% of the half tread width (W), the land ratio (non-grooved area/overall area) of the ground contacting patch during straight running becomes excessively increased, and the roll characteristic and the absorbability for disturbance input from the road surface decreases are deteriorated.

The inside oblique main groove 10 is, from its axially inner end (Ai) to axially outer end (Ao), inclined to the axially outside of the tire towards the intended tire rotational direction (R).

The inclination angle α of the inside oblique main grooves 10 is set in the range of from 5 to 30 degrees with respect to the tire circumferential direction.

In this embodiment, the angle α is gradually increased from the axially inner end (Ai) toward the axially outer end (Ao) so that the groove is curved. It is however also possible to set a constant value to the angle α so that the inside oblique main groove 10 is formed as a straight groove.

The axial length a1 of the inside oblique main groove 10 is preferably not less than 25%, more preferably not less than 28%, but not more than 35%, more preferably not more than 32% of the half tread width (W).
If the axial length a1 becomes more than 35%, there is a possibility that traction during straight running decreases. If the axial length a1 becomes less than 25%, there is a possibility that the absorbability for disturbance input during the initial stage of leaning is deteriorated.

The circumferential length a2 of the inside oblique main groove 10 is preferably not less than 40%, more preferably not less than 43%, but not more than 50%, more preferably not more than 47% of the circumferential pitch length P of the inside oblique main grooves 10 shown in FIG. 3.
If the circumferential length a2 becomes less than 40%, there is a possibility that the absorbability for disturbance input is deteriorated. If the circumferential length a2 becomes more than 50%, there is a possibility that the pattern rigidity in the axial direction decreases and the roll characteristic in the initial stage is deteriorated.

It is preferable that the inside oblique main grooves 10 on one side of the tire equator (C) and those on the other side of the tire equator (c) are staggered.
Further, the inside oblique main grooves 10 on one side of the tire equator (c) do not overlap, in the tire circumferential direction, with those on the other side of the tire equator (C). As a result, the tread center region is provided with circumferential rigidity, and the traction performance and tire life can be improved.

The outside oblique main grooves 11 on one side of the tire equator (C) and those on the other side of the tire equator (C) are staggered.

The outside oblique main groove 11 is, from its axially inner end (Bi) to axially outer end (Bo), inclined to the axially outside of the tire extend, toward the opposite direction to the intended tire rotational direction (R). Thus, on each side of the tire equator (c), the outside oblique main grooves 11 are inclined oppositely to the inside oblique main grooves 10.
As a result, in cooperation with the inside oblique main grooves 10, the outside oblique main grooves 11 can maintain the pattern rigidity to improve the roll characteristic.

On each side of the tire equator (c), the axially inner ends (Bi) of the outside oblique main grooves 11 are located axially inward of the axially outer ends (Ao) of the inside oblique main grooves 10.
Thus, in cooperation with the inside oblique main grooves 10, the outside oblique main grooves 11 can make the change in the pattern rigidity in the tire axial direction smooth or continuous, and can improve the roll characteristic from the stage of straight running to the middle stage of the leaning.

From this viewpoint, the axial distance W2 of the axially inner end (Bi) from the tire equator (c) is preferably not less than 20%, more preferably not less than 23%, but not more than 30%, more preferably not more than 27% of the half tread width (W).

The axial overlap W3 between the outside oblique main groove 11 and the inside oblique main groove 10, namely, the axial distance between the axially inner end (Bi) and the axially outer end (Ao) is preferably not less than 5%, more preferably not less than 8%, but not more than 15%, more preferably not more than 12% of the half tread width (W).
If the axial overlap W3 is less than 5%, there is a possibility that the roll characteristic in the initial stage is deteriorated.
If the axial overlap W3 is more than 15%, there is a possibility that the pattern rigidity in the tire circumferential direction decreases, and the traction performance is deteriorated.

The axial distance W4 of the axially outer end (Bo) from the tire equator (c) is set in a range of not less than 80%, preferably not less than 85%, but not more than 95%, preferably not more than 90% of the half tread width (W). Therefore, the change in the pattern rigidity in the axial direction from straight running to full lean, becomes smooth or continuous, and the roll characteristic can be improved.

Further, it is preferable that the axially outer end (Bo) of the outside oblique main groove 11 overlaps, in the tire circumferential direction, with the circumferentially adjacent inside oblique main groove 10. Thereby, the pattern rigidity in the tire circumferential direction becomes continuous around the tire, and the traction performance during cornering can be improved.

From this viewpoint, the circumferential overlap L1 between the outside oblique main groove 11 and the inside oblique main groove 10, namely, the circumferential distance between the axially outer end (Bo) and the axially outer end (Ao) of the inside oblique main grooves 10 is preferably not less than 5%, more preferably not less than 8%, but not more than 15%, more preferably not more than 12% of the circumferential pitch length P of the inside oblique main grooves 10.

The angle β of the outside oblique main groove 11 with respect to the tire circumferential direction is gradually increased from the axially inner end (Bi) toward the axially outer end (Bo) within a range of from 10 to 60 degrees. Therefore, as the camber angle is increased when making a turn, the rigidity in the tire axial direction of the ground contacting patch is increased, and the linear feeling is also increased. Thereby, the roll characteristic can be improved.

From this viewpoint, it is more preferable to set the angle β of the outside oblique main groove 11 such that the angle β1 in a heel-side part is within a range of from 10 to 30 degrees, and the angle β2 in a toe-side part is within a range of from 40 to 60 degrees.
The heel-side part is a part of the outside oblique main groove 11 extending from the axially inner end (Bi) to ⅓ of the entire length of the outside oblique main groove 11.
The toe-side part is a part of the outside oblique main groove 11 extending from the axially outer ends (Bo) to ⅓ of the entire length of the outside oblique main groove 11.

The terms "heel-side" and "toe-side" mean "rear-side" and "front-side", respectively, when considered in the ground contacting patch of the tire in relation to the traveling direction of the tire rotated in the intended tire rotational direction.

The axial length b1 of the outside oblique main groove 11 is preferably not less than 60%, more preferably not less than 65%, but not more than 75%, more preferably not more than 70% of the half tread width (W).
If the axial length b1 becomes less than 60%, then the axially outer ends (Ao) of the inside oblique main grooves 10 and the axially inner ends (Bi) of the outside oblique main grooves 11 shift axially outward, and there is a possibility that the roll characteristic in the middle stage of the leaning is deteriorated. If the axial length b1 becomes more than 75%, then the outer ends (Ao) and the axially inner ends (Bi) approach the tire equator (C), and there is a possibility that the traction performance is deteriorated.

The circumferential length b2 of the outside oblique main groove 11 is preferably not less than 35%, more preferably not less than 40%, but not more than 50%, more preferably not more than 45% of the circumferential pitch length P of the inside oblique main grooves 10.

If the length b2 becomes less than 35%, there is a possibility that the absorbability for disturbance input is deteriorated. If the length b2 becomes more than 50%, there is a possibility that the traction performance during cornering is deteriorated.

It is preferable that each of the outside oblique main groove 11 overlap, in the tire circumferential direction, with one of the inside oblique main grooves 10 on the same side of the tire equator, and one of the inside oblique main grooves 10 on the other side of the tire equator. Thereby, the circumferential rigidity in the ground contacting patch during straight running and adjacent part becomes smooth in the tire circumferential direction, and the traction performance can be improved.

Figure 4:
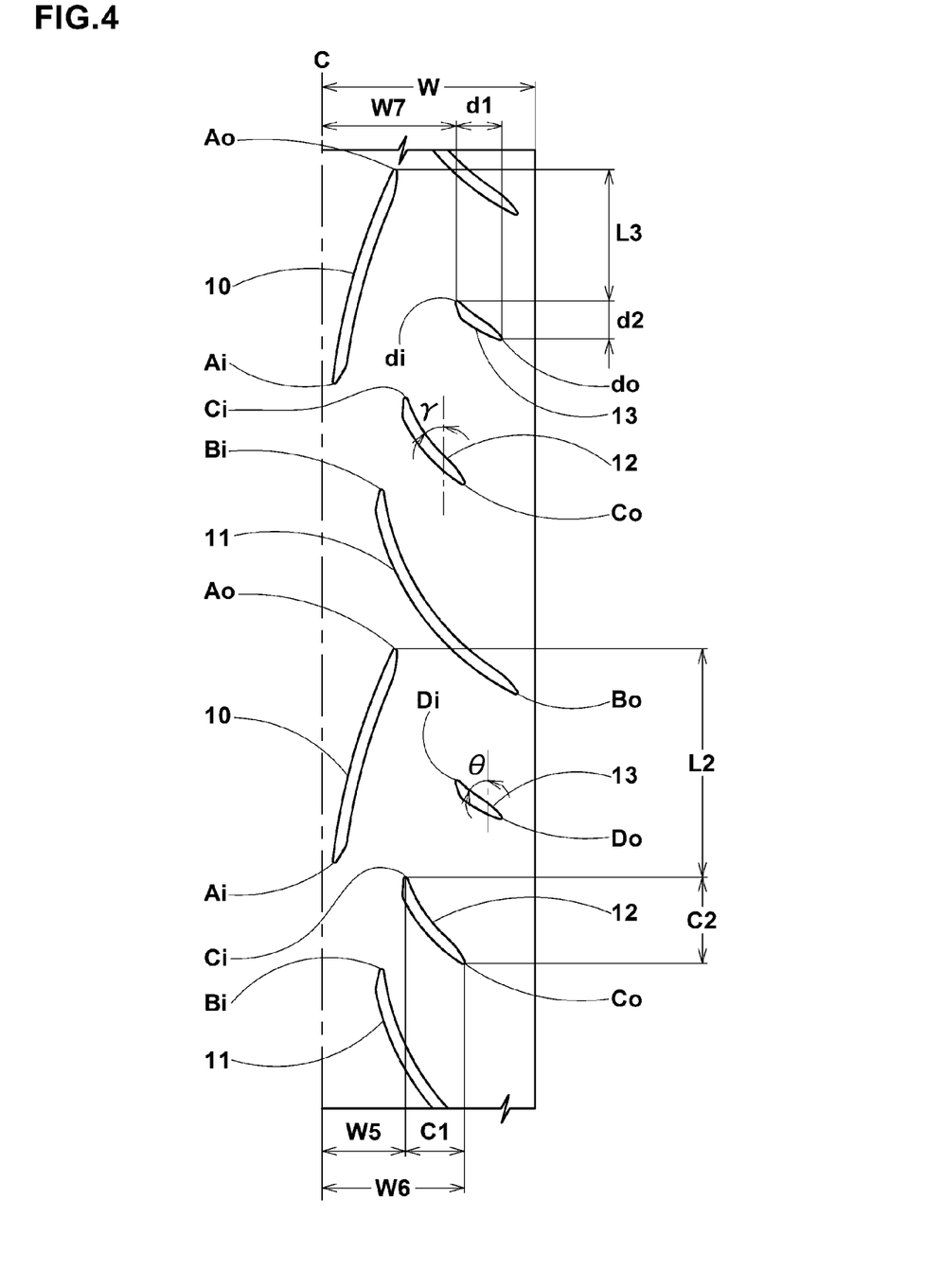

It is preferable that the middle oblique main grooves 12 on one side of the tire equator (c) and those on the other side of the tire equator (C) are staggered, and the middle oblique main grooves 12 are inclined to the axially outside of the tire toward the opposite direction to the intended tire rotational direction (R).

The middle oblique main grooves 12 can provide additional drainage in the portions between the outside oblique main grooves 11 and can optimize the rigidity in the tire circumferential direction of the tread portion contacting with the ground during cornering. And the roll characteristic can be improved.

It is preferable that the axially inner ends (Ci) of the middle oblique main grooves 12 are located axially outward of the axially outer ends (Ao) of the inside oblique main grooves 10. Thereby, the pattern rigidity in the tire circumferential direction is secured and the traction performance can be improved.

It is preferable that the axial distance W5 of the axially inner end (Ci) from the tire equator (c) is preferably not less than 30%, more preferably not less than 35%, but not more than 45%, more preferably not more than 40% of the half tread width (W).

If the axial distance W5 becomes less than 30%, there is a possibility that the axially inner ends (Ci) excessively approach the inside oblique main grooves 10, and the traction performance and tire life are deteriorated. If the axial distance W5 becomes more than 45%, there is a possibility that the roll characteristic is deteriorated.

It is preferable that the circumferential distance L2 between the axially inner end (Ci) of the middle oblique main groove 12 and the axially outer end (Ao) of the inside oblique main groove 10 is preferably not less than 40%, more preferably not less than 45%, but not more than 55%, more preferably not more than 50% of the circumferential pitch length P of the inside oblique main grooves 10.

If the circumferential distance L2 becomes less than 40%, there is a possibility that the circumferential rigidity is decreased, and the traction performance during cornering is deteriorated. If the circumferential distance L2 becomes more than 55%, there is a possibility that the roll characteristic is deteriorated.

It is preferable that the axially outer ends (Co) of the middle oblique main grooves 12 are located axially inward of the axially outer ends (Bo) of the outside oblique main grooves 11. Thereby, the rigidity of the ground contacting patch in full bank is secured, and the roll characteristic can be improved.

It is preferable that the axial distance W6 of the axially outer end (Co) of the middle oblique main groove 12 from the tire equator (C) is not less than 55%, more preferably not less than 60%, but not more than 75%, more preferably not more than 70% of the half tread width (W).

If the axial distance W6 becomes less than 55%, there is a possibility that the drainage during cornering becomes insufficient. If the axial distance W6 becomes more than 75%, there is a possibility that the steering stability in full lean is deteriorated.

It is preferable that the angle $\gamma$ of the middle oblique main groove 12 with respect to the tire circumferential direction is not less than 25 degrees, more preferably not less than 35 degrees, but not more than 50 degrees, more preferably not more than 40 degrees.

If the angle $\gamma$ becomes less than 25 degrees, there is a possibility that the pattern rigidity in the axial direction is decreased, and the roll characteristic is deteriorated. If the angle $\gamma$ becomes more than 50 degrees, there is a possibility that the drainage is not increased by the middle oblique main grooves 12.

It is preferable that the axial length C1 of the middle oblique main groove 12 is not less than 25%, more preferably not less than 28%, but not more than 35%, more preferably not more than 32% of the half tread width (W).

If the length C1 becomes less than 25%, there is a possibility that the absorbability for disturbance input during cornering is deteriorated. If the length C1 becomes more than 35%, there is a possibility that the traction performance during cornering is deteriorated.

It is preferable that the circumferential length C2 of the middle oblique main groove 12 is not less than 15%, more preferably not less than 18%, but not more than 25%, more preferably not more than 22% of the circumferential pitch length P of the inside oblique main grooves 10.

If the length C2 becomes less than 15%, there is a possibility that the roll characteristic is deteriorated. If the length C2 becomes more than 25%, there is a possibility that the traction performance during cornering is deteriorated.

In the tire circumferential direction, the outside oblique subsidiary grooves 13 are disposed between the outside oblique main grooves 11 and middle oblique main grooves 12.

In this example, on each side of the tire equator, these grooves 11, 12 and 13 are arranged circumferentially of the tire in this order repeatedly (namely, 11-12-13-11-12-13-11-12-13 - - - ).

It is desirable that the outside oblique subsidiary grooves 13 are inclined to the axially outside of the tire toward the opposite direction to the intended tire rotational direction (R).

It is preferable that the outside oblique subsidiary grooves 13 on one side of the tire equator (c) and those on the other side of the tire equator (c) are staggered.

The outside oblique subsidiary grooves 13 can optimize the pattern rigidity in cooperation with the middle oblique main grooves 12 to improve the roll characteristic.

It is preferable that the axially inner ends (Di) of the outside oblique subsidiary grooves 13 are disposed axially inward of the axially inner ends (Co) of the middle oblique main grooves 12. Thereby, the roll characteristic near full lean can be improved.

From this viewpoint, it is preferred that the axial distance W7 of the axially inner end (Di) from the tire equator (C) not less than 55%, more preferably not less than 60%, but not more than 70%, more preferably not more than 65% of the half tread width (W).

The circumferential distance L3 between the axially inner end (Di) of the outside oblique subsidiary groove 13 and the axially outer end (Ao) of the inside oblique main groove 10 is preferably not less than 20%, more preferably not less than 25%, but not more than 35%, more preferably not more than 30% of the circumferential pitch length P of the inside oblique main grooves 10.

If the circumferential distance L3 becomes less than 20%, there is a possibility that the pattern rigidity in the tire circumferential direction decreases, and the traction performance during cornering is deteriorated. If the circumferential distance L3 becomes more than 35%, there is a possibility that the roll characteristic is deteriorated.

It is desirable that the axially outer ends (Do) of the outside oblique subsidiary grooves 13 are disposed axially outward of the axially outer ends (Co) of the middle oblique main grooves 12, and axially inward of the axially outer ends (Bo) of the outside oblique main grooves 11. Thereby, the change in the pattern rigidity due to the provision of the outside oblique main grooves 11 and the middle oblique main grooves 12 becomes smooth, and the roll characteristic can be improved.

From this viewpoint, it is preferred that the axial distance W8 of the axially outer end (Do) from the tire equator (C) not less than 75%, more preferably not less than 80%, but not more than 90%, more preferably not more than 85% of the half tread width (W).

It is preferable that the angle θ of the outside oblique subsidiary groove 13 with respect to the tire circumferential direction is not less than 50 degrees, more preferably not less than 55 degrees の angle, but not more than 70 degrees, more preferably not more than 65 degrees.

If the angle θ becomes less than 50 degrees, there is a possibility that the pattern rigidity in the axial direction decreases, and the roll characteristic is deteriorated near full lean. If the angle θ becomes more than 70 degrees, there is a possibility that the traction performance during cornering is deteriorated.

It is preferable that the axial length d1 of the outside oblique subsidiary groove 13 is not less than 15%, more preferably not less than 20%, but not more than 30%, more preferably not more than 25% of the half tread width (W). If the length d1 becomes less than 15%, there is a possibility that the drainage near full lean becomes insufficient. If the length d1 becomes more than 30%, there is a possibility that the traction performance is deteriorated.

It is preferable that the circumferential length d2 of the outside oblique subsidiary groove 13 is not less than 3%, more preferably not less than 8%, but not more than 15%, more preferably not more than 10% of the circumferential pitch length P of the inside oblique main grooves 10.

If the length d2 becomes less than 3%, there is a possibility that the absorbability for disturbance input near full lean is deteriorated. If the length d2 becomes more than 15%, there is a possibility that the roll characteristic is deteriorated.

It is preferable that the above-mentioned axial lengths b1, c1 and d1 of the grooves 11, 12 and 13 satisfy the following condition: b1>c1>d1, and the above-mentioned circumferential lengths b2, c2 and d2 of the grooves 11, 12 and 13 satisfy the following condition: b2>c2>d2. Thereby, the tread pattern rigidity is optimized, and the roll characteristic from straight running to full lean can be improved.

It is preferable that the sea ratio Rc in the tread center region is set in a range of from 5 to 15% in order to increase the drainage.

Here, the sea ratio is a ratio of the grooved area in the concerned region to the overall area of the concerned region (or negative ratio). The tread center region is centered on the tire equator (C) and extends from the tire equator (C) toward each side thereof by an axial distance of 25 to 35% of the half tread width (W).

In the wet conditions, it is very rare to make a turn with a large camber angle such that the tread shoulder region near the tread edge Te contacts with the ground. Therefore, it is rather important to increase the pattern rigidity in the tread shoulder region for the dry conditions.

Therefore, the sea ratio Rs in the tread shoulder region is set in a range of from 5 to 10%.

The tread shoulder region is defined as extending from the tread edge Te by an axial distance of 25 to 35% of the half tread width (W).

The widths and depths of the inside oblique main grooves 10, the outside oblique main grooves 11, the middle oblique main grooves 12, and the outside oblique subsidiary grooves 13 may be arbitrarily set.

Comparison Tests

Test tires having the internal structure shown FIG. 1 and specifications shown in Table 1 were prepared and tested as follows.

Front tire: size 120/70zR17 (rim: 17xmT3.50), tire pressure 250 kPa

Rear tire: size 180/55zR17 (rim: 17xmT5.50), tire pressure 290 kPa

By the use of a 750 cc motorcycle, test run was carried out on a dry asphalt road in a tire test course, and with respect to each test tire, the test rider evaluated the following items on a scale of a hundred.

The results are indicated in Table 1.

Absorbability: absorbability for disturbance input from road surface

Initial stage roll characteristic: motion and roll rate when initiate lean into a turn Middle to final stage roll characteristic: steering stability, roll rate and transitional response from middle stage to final stage of leaning Traction performance: feeling of circumferential rigidity when driving force is applied After running for a predetermined distance, the depths of the inside oblique main grooves were measured. The results are indicated in Table 1 as a percentage of the original depth. The higher the percentage, the longer the tire life.

As shown, according to the present invention, the roll characteristic can be improved without sacrificing the traction performance and tire life.

TABLE 1

| Tire | Conv. | Ref. 1 | Ex. 1 | Ex. 2 | Ex. 3 | Ref. 2 | Ex. 4 | Ex. 5 | Ref. 3 | Ref. 4 | Ex. 5 |
|---|---|---|---|---|---|---|---|---|---|---|---|
| distance W1/width (W) (%) | −10.0 | −5.0 | 0.0 | 5.0 | 10.0 | 20.0 | 5.0 | 5.0 | 5.0 | 5.0 | 5.0 |
| angle α (deg.) | 20.0 | 10.0 | 10.0 | 10.0 | 10.0 | 10.0 | 5.0 | 30.0 | 35.0 | 10.0 | 10.0 |
| length a1/width (W) (%) | 59.1 | 31.8 | 31.8 | 31.8 | 31.8 | 31.8 | 31.8 | 31.8 | 31.8 | 31.8 | 31.8 |
| length a2/width (W) (%) | 36.0 | 44.0 | 44.0 | 44.0 | 44.0 | 44.0 | 44.0 | 44.0 | 44.0 | 44.0 | 44.0 |
| distance W2/width (W) (%) | 27.3 | 22.7 | 22.7 | 22.7 | 22.7 | 22.7 | 22.7 | 22.7 | 22.7 | 22.7 | 22.7 |
| overlap W3/width (W) (%) | 27.3 | 9.1 | 9.1 | 9.1 | 9.1 | 9.1 | 9.1 | 9.1 | 9.1 | 9.1 | 9.1 |
| distance W4/width (%) | 90.0 | 90.0 | 90.0 | 90.0 | 90.0 | 90.0 | 90.0 | 90.0 | 90.0 | 75.0 | 80.0 |

TABLE 1-continued

| | | | | | | | | | | | |
|---|---|---|---|---|---|---|---|---|---|---|---|
| angle β1 (deg.) | 60.0 | 20.0 | 20.0 | 20.0 | 20.0 | 20.0 | 20.0 | 20.0 | 20.0 | 20.0 | 20.0 |
| angle β2 (deg.) | 65.0 | 60.0 | 60.0 | 60.0 | 60.0 | 60.0 | 60.0 | 60.0 | 60.0 | 60.0 | 60.0 |
| length b1/width (W) (%) | 45.4 | 68.0 | 68.0 | 68.0 | 68.0 | 68.0 | 68.0 | 68.0 | 68.0 | 68.0 | 68.0 |
| length b2/width (W) (%) | 40.9 | 44.0 | 44.0 | 44.0 | 44.0 | 44.0 | 44.0 | 44.0 | 44.0 | 44.0 | 44.0 |
| overlap L1/pitch P (%) | 18.0 | 10.0 | 10.0 | 10.0 | 10.0 | 10.0 | 10.0 | 10.0 | 10.0 | 10.0 | 10.0 |
| distance W5/width (W) (%) | 22.7 | 36.4 | 36.4 | 36.4 | 36.4 | 36.4 | 36.4 | 36.4 | 36.4 | 36.4 | 36.4 |
| distance L2/width (W) (%) | 18.2 | 48.0 | 48.0 | 48.0 | 48.0 | 48.0 | 48.0 | 48.0 | 48.0 | 48.0 | 48.0 |
| angle γ (deg.) | 60.0 | 60.0 | 60.0 | 60.0 | 60.0 | 60.0 | 60.0 | 60.0 | 60.0 | 60.0 | 60.0 |
| length c1/width (W) (%) | 45.5 | 45.5 | 45.5 | 45.5 | 45.5 | 45.5 | 45.5 | 45.5 | 45.5 | 45.5 | 45.5 |
| length c2/width (W) (%) | 18.0 | 18.0 | 18.0 | 18.0 | 18.0 | 18.0 | 18.0 | 18.0 | 18.0 | 18.0 | 18.0 |
| distance W7/width (W) (%) | 59.1 | 63.6 | 63.6 | 63.6 | 63.6 | 63.6 | 63.6 | 63.6 | 63.6 | 63.6 | 63.6 |
| distance L3/width (W) (%) | 36.0 | 28.0 | 28.0 | 28.0 | 28.0 | 28.0 | 28.0 | 28.0 | 28.0 | 28.0 | 28.0 |
| angle θ (deg.) | 50.0 | 60.0 | 60.0 | 60.0 | 60.0 | 60.0 | 60.0 | 60.0 | 60.0 | 60.0 | 60.0 |
| length d1/width (W) (%) | 31.8 | 22.7 | 22.7 | 22.7 | 22.7 | 22.7 | 22.7 | 22.7 | 22.7 | 22.7 | 22.7 |
| length d2/width (W) (%) | 16.0 | 18.2 | 18.2 | 18.2 | 18.2 | 18.2 | 18.2 | 18.2 | 18.2 | 18.2 | 18.2 |
| sea ratio Rc | 12.0 | 12.0 | 10.0 | 9.0 | 8.0 | 7.0 | 9.0 | 9.0 | 9.0 | 9.0 | 9.0 |
| sea ratio Rs | 5.0 | 6.0 | 6.0 | 6.0 | 6.0 | 6.0 | 6.0 | 6.0 | 6.0 | 6.0 | 6.0 |
| Absorbability | 80 | 90 | 85 | 80 | 80 | 70 | 80 | 80 | 70 | 80 | 80 |
| Roll characteristic | | | | | | | | | | | |
| Initial stage | 80 | 80 | 80 | 80 | 80 | 70 | 75 | 70 | 60 | 80 | 80 |
| middle to final stage | 80 | 70 | 85 | 90 | 85 | 70 | 90 | 80 | 60 | 60 | 80 |
| Traction performance | 60 | 70 | 75 | 80 | 80 | 90 | 80 | 80 | 80 | 80 | 80 |
| Tire life | 70 | 70 | 75 | 80 | 80 | 90 | 80 | 80 | 80 | 80 | 80 |

| Tire | Ex. 6 | Ref. 5 | Ref. 6 | Ex. 7 | Ex. 8 | Ref. 7 | Ex. 8 | Ref. 8 | Ex. 9 | Ex. 10 | Ex. 11 |
|---|---|---|---|---|---|---|---|---|---|---|---|
| distance W1/width (W) (%) | 5.0 | 5.0 | 5.0 | 5.0 | 5.0 | 5.0 | 5.0 | 5.0 | 5.0 | 5.0 | 5.0 |
| angle α (deg.) | 10.0 | 10.0 | 10.0 | 10.0 | 10.0 | 10.0 | 10.0 | 10.0 | 10.0 | 10.0 | 10.0 |
| length a1/width (W) (%) | 31.8 | 31.8 | 31.8 | 31.8 | 31.8 | 31.8 | 27.3 | 31.8 | 31.8 | 31.8 | 31.8 |
| length a2/width (W) (%) | 44.0 | 44.0 | 44.0 | 44.0 | 44.0 | 44.0 | 36.0 | 44.0 | 44.0 | 44.0 | 44.0 |
| distance W2/width (W) (%) | 22.7 | 22.7 | 22.7 | 22.7 | 22.7 | 22.7 | 22.7 | 36.4 | 22.7 | 22.7 | 22.7 |
| overlap W3/width (W) (%) | 9.1 | 9.1 | 9.1 | 9.1 | 9.1 | 9.1 | 9.1 | 9.1 | 9.1 | 9.1 | 9.1 |
| distance W4/width (%) | 95.0 | 100.0 | 90.0 | 90.0 | 90.0 | 90.0 | 90.0 | 90.0 | 90.0 | 90.0 | 90.0 |
| angle β1 (deg.) | 20.0 | 20.0 | 10.0 | 20.0 | 60.0 | 70.0 | 20.0 | 20.0 | 20.0 | 20.0 | 20.0 |
| angle β2 (deg.) | 60.0 | 60.0 | 10.0 | 20.0 | 60.0 | 70.0 | 60.0 | 60.0 | 60.0 | 60.0 | 60.0 |
| length b1/width (W) (%) | 68.0 | 68.0 | 68.0 | 68.0 | 68.0 | 68.0 | 68.0 | 68.0 | 68.0 | 68.0 | 68.0 |
| length b2/width (W) (%) | 44.0 | 44.0 | 44.0 | 44.0 | 44.0 | 44.0 | 44.0 | 44.0 | 44.0 | 44.0 | 44.0 |
| overlap L1/pitch P (%) | 10.0 | 10.0 | 10.0 | 10.0 | 10.0 | 10.0 | 10.0 | 10.0 | 10.0 | 10.0 | 10.0 |
| distance W5/width (W) (%) | 36.4 | 36.4 | 36.4 | 36.4 | 36.4 | 36.4 | 36.4 | 36.4 | 50.0 | — | 36.4 |
| distance L2/width (W) (%) | 48.0 | 48.0 | 48.0 | 48.0 | 48.0 | 48.0 | 48.0 | 48.0 | 48.0 | — | 48.0 |
| angle γ (deg.) | 60.0 | 60.0 | 60.0 | 60.0 | 60.0 | 60.0 | 60.0 | 60.0 | 60.0 | — | 60.0 |
| length c1/width (W) (%) | 45.5 | 45.5 | 45.5 | 45.5 | 45.5 | 45.5 | 45.5 | 45.5 | 45.5 | — | 45.5 |
| length c2/width (W) (%) | 18.0 | 18.0 | 18.0 | 18.0 | 18.0 | 18.0 | 18.0 | 18.0 | 18.0 | — | 18.0 |
| distance W7/width (W) (%) | 63.6 | 63.6 | 63.6 | 63.6 | 63.6 | 63.6 | 63.6 | 63.6 | 63.6 | — | — |
| distance L3/width (W) (%) | 28.0 | 28.0 | 28.0 | 28.0 | 28.0 | 28.0 | 28.0 | 28.0 | 28.0 | — | — |
| angle θ (deg.) | 60.0 | 60.0 | 60.0 | 60.0 | 60.0 | 60.0 | 60.0 | 60.0 | 60.0 | — | — |
| length d1/width (W) (%) | 22.7 | 22.7 | 22.7 | 22.7 | 22.7 | 22.7 | 22.7 | 22.7 | 22.7 | — | — |
| length d2/width (W) (%) | 18.2 | 18.2 | 18.2 | 18.2 | 18.2 | 18.2 | 18.2 | 18.2 | 18.2 | — | — |
| sea ratio Rc | 9.0 | 9.0 | 9.0 | 9.0 | 9.0 | 9.0 | 9.0 | 9.0 | 9.0 | 9.0 | 9.0 |
| sea ratio Rs | 6.0 | 6.0 | 6.0 | 6.0 | 6.0 | 6.0 | 6.0 | 6.0 | 6.0 | 2.0 | 4.0 |
| Absorbability | 80 | 80 | 80 | 80 | 80 | 80 | 60 | 80 | 80 | 80 | 80 |
| Roll characteristic | | | | | | | | | | | |
| Initial stage | 80 | 80 | 75 | 80 | 80 | 80 | 80 | 80 | 80 | 80 | 80 |
| middle to final stage | 80 | 60 | 60 | 70 | 80 | 65 | 60 | 70 | 70 | 60 | 70 |
| Traction performance | 80 | 80 | 80 | 80 | 80 | 80 | 80 | 80 | 80 | 80 | 80 |
| Tire life | 80 | 80 | 80 | 80 | 80 | 80 | 80 | 80 | 80 | 80 | 80 |

The invention claimed is:

1. A motorcycle tire comprising a tread portion having tread edges and a tread face extending therebetween and curved so that the maximum section width of the tire lies between the tread edges, the tread portion being provided with tread grooves defining a unidirectional tread pattern having an intended tire rotational direction (R), the tread grooves which are separated from each other include inside oblique main grooves and outside oblique main grooves, wherein the inside oblique main grooves are arranged circumferentially of the tire and staggeredly on both side of the tire equatorial plane (C), the inside oblique main grooves each extending from its axially inner end (Ai) to its axially outer end (Ao), while inclining to the axially outside of the tire toward the intended tire rotational direction (R) at an inclination angle α of from 5 to 30 degrees with respect to the tire circumferential direction, the axially inner end (Ai) is spaced apart axially outwardly from the tire equatorial plane (C) by an axial distance of from 0 to 10% of a half tread width (W) measured from the tire equator to one of the tread edges along the tread face and a tire meridian section, the outside oblique main grooves are arranged circumferentially of the tire and staggeredly positioned on both side of the tire equatorial plane (C), the outside oblique main grooves each extend from its axially inner end (Bi) to its axially outer end (Bo), while inclining to the axially outside of the tire toward the opposite direction to the intended tire rotational direction (R), the axially inner end (Bi) is located axially inward of the outer end (Ao) of the inside oblique main groove, the axially outer end (Bo) is spaced apart from the tire equatorial plane (C) by an axial distance of from 80 to 95% of the half tread width (W), an inclination angle β of the outside oblique main groove with respect to the tire circumferential direction is gradually increased from the inner end (Bi) to the axially outer ends (Bo) within a range between 10 degrees and 60 degrees, wherein the outside oblique main grooves on each side of the tire equatorial plane (C) each overlap, in the tire circumferential direction, with one of the inside oblique main grooves on the same side and one of the inside oblique main grooves on the other side of the tire equatorial plane (C), wherein the tread grooves further include middle oblique main grooves disposed on each side of the tire equatorial plane (C), the middle oblique main grooves are inclined to the axially outside of the tire toward the opposite direction to the intended tire rotational direction (R), and on each side of the tire equatorial plane (C), axially inner ends (Ci) of the middle oblique main grooves are positioned axially outward of the axially outer ends (Ao) of the inside oblique main grooves, and axially outer ends (Co) of the middle oblique main grooves are positioned axially inward of the axially outer ends (Bo) of the outside oblique main grooves, wherein the tread grooves further include outside oblique subsidiary grooves disposed on each side of the tire equatorial plane (C), the outside oblique subsidiary grooves are inclined to the axially outside of the tire toward the opposite direction to the intended tire rotational direction (R), and on each side of the tire equatorial plane (C), axially inner ends (Di) of the outside oblique subsidiary grooves are positioned axially inward of the axially outer ends (Co) of the middle oblique main grooves, and axially outer ends (Do) of the outside oblique subsidiary grooves are positioned axially outward of the axially outer ends (Co) of the middle oblique main grooves and axially inward of the axially outer ends (Bo) of the outside oblique main grooves, wherein the outside oblique main grooves are longer than the middle oblique main grooves which are longer than the outside oblique subsidiary grooves, and on each side of the tire equatorial plane (C), between every circumferentially adjacent two of the outside oblique main grooves, one of the middle oblique main grooves and one of the outside oblique subsidiary grooves are disposed such that one of said circumferentially adjacent two outside oblique main grooves, said one of the middle oblique main grooves and said one of the outside oblique subsidiary grooves are arranged in the order of groove lengths in one tire circumferential direction, wherein on each side of the tire equator, regions each defined by being axially outside one of the inside oblique main grooves and disposed between the circumferentially adjacent two outside oblique main grooves, are each provided with no grooves other than said one of the middle oblique main grooves and said one of the outside oblique subsidiary grooves, and one end portion of each of the inside oblique main grooves extends toward a central part of a length of one of the outside oblique main grooves, and no groove is disposed between the end of said one end portion of each of the inside oblique main grooves and said one of the outside oblique main grooves.

2. The motorcycle tire of claim 1, wherein an axial length a1 of the each said inside oblique main groove is 25-35% of the half tread width (W).

3. The motorcycle tire of claim 1, wherein a circumferential length a2 of each said inside oblique main groove is 40-50% of the circumferential pitch length P of the inside oblique main grooves.

4. The motorcycle tire of claim 1, wherein an axial overlap between each of said circumferential adjacent two outside oblique main grooves and said one of the inside oblique main grooves is 5-15% of the half tread width (W).

5. The motorcycle tire of claim 1, wherein an axial length b1 of each said outside oblique main groove is 60-75% of the half tread width (W).

6. The motorcycle tire of claim 1 wherein a circumferential length b2 of each said outside oblique main groove is 35-50% of the circumferential pitch length P of the inside oblique main grooves.

7. The motorcycle tire of claim 1, wherein an axial distance W5 of the axially inner end (Ci) of each said middle oblique main groove from the tire equator (C) is 30-45% of the half tread width (W).

8. The motorcycle tire of claim 1, wherein an axial distance W6 of the axially outer end (Co) of each said middle oblique main groove from the tire equator (C) is 55-75% of the half tread width (W).

9. The motorcycle tire of claim 1, wherein an angle γ of each said middle oblique main groove with respect to the tire circumferential direction is 25-35 degrees.

10. The motorcycle tire of claim 1, wherein an axial length C1 of each said middle oblique main groove is 25-35% of the half tread width (W).

11. The motorcycle tire of claim 1, wherein a circumferential length C2 of each said middle oblique main groove is 15-25% of a circumferential pitch length P of the inside oblique main grooves.

12. The motorcycle tire of claim 1, wherein
the inside oblique main grooves, the middle oblique main grooves and the outside oblique main grooves are curved concavely toward the tire equatorial plane (C).

* * * * *